(12) United States Patent
Basho (10) Patent No.: US 10,165,164 B2
(45) Date of Patent: Dec. 25, 2018

(54) IMAGE PICKUP APPARATUS HAVING ROTATING SPHERE SECTION AND STOPPER STRUCTURE FOR LIMITING ROTATION OF THE ROTATING SPHERE SECTION

(71) Applicant: SONY CORPORATION, Tokyo (JP)

(72) Inventor: Yutaka Basho, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/910,727

(22) PCT Filed: Aug. 15, 2014

(86) PCT No.: PCT/JP2014/071468
§ 371 (c)(1),
(2) Date: Feb. 8, 2016

(87) PCT Pub. No.: WO2015/029802
PCT Pub. Date: Mar. 5, 2015

(65) Prior Publication Data
US 2016/0182783 A1      Jun. 23, 2016

(30) Foreign Application Priority Data

Aug. 30, 2013 (JP) .................................. 2013-179603

(51) Int. Cl.
*H04N 5/225* (2006.01)
*G08B 13/196* (2006.01)
(Continued)

(52) U.S. Cl.
CPC ........... *H04N 5/2254* (2013.01); *G03B 17/02* (2013.01); *G08B 13/19632* (2013.01);
(Continued)

(58) Field of Classification Search
None
See application file for complete search history.

(56) References Cited

U.S. PATENT DOCUMENTS

| 5,502,598 A | 3/1996 | Kimura et al. |
| 6,268,882 B1 * | 7/2001 | Elberbaum ...... G08B 13/19619 348/143 |

(Continued)

FOREIGN PATENT DOCUMENTS

| JP | 6-148494 A | 5/1994 |
| JP | 2000-156806 A | 6/2000 |

(Continued)

OTHER PUBLICATIONS

Extended European Search Report dated Mar. 2, 2017 in European Patent Application No. 14840428.8.
(Continued)

*Primary Examiner* — Twyler L Haskins
*Assistant Examiner* — Wesley J Chiu
(74) *Attorney, Agent, or Firm* — Oblon, McClelland, Maier & Neustadt, L.L.P.

(57) ABSTRACT

Aspects of the present disclosure provide an image pickup apparatus that includes a lens tube, a supporting member, and a retaining member. The lens tube includes a rotating sphere section. The retaining member has a circular opening. The retaining member accommodates the rotating sphere section on an inner side of the circular opening. A portion of the rotating sphere section is movably received between the supporting member and the retaining member. The rotating sphere section includes a protrusion formed on a front surface thereof. The retaining member has a stopper structure that comes into contact with the front surface of the rotating sphere section by an elastic force. The rotating sphere section is rotatable with respect to the retaining member along a rotation direction limited to a range defined (Continued)

according to the stopper structure coming into contact with opposite sides of the protrusion.

11 Claims, 10 Drawing Sheets

(51) Int. Cl.
 *G03B 17/02* (2006.01)
 *G03B 37/02* (2006.01)
(52) U.S. Cl.
 CPC ......... *H04N 5/2251* (2013.01); *H04N 5/2252* (2013.01); *G03B 37/02* (2013.01)

(56) References Cited

U.S. PATENT DOCUMENTS

| | | | |
|---|---|---|---|
| 6,357,936 B1 * | 3/2002 | Elberbaum | G03B 37/02 206/316.2 |
| 6,476,856 B1 * | 11/2002 | Zantos | G08B 13/19619 348/143 |
| 6,678,001 B1 * | 1/2004 | Elberbaum | G08B 13/19619 348/373 |
| 2005/0122419 A1 * | 6/2005 | Yoon | H04N 5/2252 348/360 |
| 2008/0124069 A1 * | 5/2008 | Basho | G03B 27/58 396/427 |
| 2012/0188441 A1 | 7/2012 | Takizawa | |
| 2012/0307138 A1 * | 12/2012 | Matsuzawa | G03B 17/02 348/373 |
| 2014/0125824 A1 * | 5/2014 | Takizawa | G03B 5/00 348/208.3 |
| 2015/0002623 A1 * | 1/2015 | Masugi | H04N 5/23238 348/37 |

FOREIGN PATENT DOCUMENTS

| | | |
|---|---|---|
| JP | 2000-165732 A | 6/2000 |
| JP | 2004-112553 A | 4/2004 |
| JP | 2008-141233 A | 6/2008 |
| WO | WO 2012/004952 A1 | 1/2012 |

OTHER PUBLICATIONS

International Search Report dated Nov. 4, 2014 in PCT/JP2014/071468.

* cited by examiner

IMAGE PICKUP APPARATUS HAVING ROTATING SPHERE SECTION AND STOPPER STRUCTURE FOR LIMITING ROTATION OF THE ROTATING SPHERE SECTION

TECHNICAL FIELD

The present technique relates to an image pickup apparatus, more specifically, to a mechanism for enhancing reliability of an image pickup apparatus in which a lens tube accommodating an optical block and an image pickup block is rotatable.

BACKGROUND ART

An example of the lens-tube-rotation-type image pickup apparatus in which a lens tube rotates is a dome-type monitoring camera set on a ceiling, wall, and the like in a building. Dome-type cameras are set for the purpose of securing safety, improving services, and the like in hospitals, hotels, department stores, and the like and perform monitoring using photographed images. Specifically, the dome-type cameras are each obtained by accommodating an optical block constituted of a lens and an image pickup block constituted of an image pickup device in the lens tube, attaching the lens tube so as to be rotatable in both the horizontal (hereinafter, referred to as "pan direction") and vertical directions (hereinafter, referred to as "tilt direction"), and covering an outer circumference of a movable area of the lens tube by a dome-type cover. Image pickup signals from the image pickup block are connected to a monitor in a monitoring room via a coaxial cable.

Here, the dome-type cameras as described above are each set by being fixed to a ceiling, wall, and the like of a building by an embedded bracket after the coaxial cable is connected to a back surface thereof. Next, a lens is adjusted to a predetermined orientation (direction and angle) by an angle adjustment mechanism of the lens tube, and focus and zoom of the lens are set. At this time, the setting is performed while looking at a monitor image at a setting location and checking an image pickup direction and range using a portable monitor. Finally, dust is prevented by attaching a dome-type cover on a front surface, and a series of setting tasks is ended.

As described above, when setting the dome-type camera, the lens orientation is set by adjusting an angle of the lens tube. A technique that uses a ball joint as the angle adjustment mechanism is known. Specifically, this technique enables the lens tube to be rotationally adjustable in the pan direction and tilt direction by a rotating sphere section provided at a base end of the lens tube and the rotating sphere section to be fixed to a supporting member provided on a pedestal by a retaining member (see, for example, Patent Document 1).

Patent Document 1: Japanese Patent Application Laid-open No. 2000-156806

SUMMARY OF INVENTION

Problem to be Solved by the Invention

The dome-type cameras are set on walls, ceilings, and the like and are also sometimes set on tilted walls and the like. Depending on where the dome-type camera is set, a photographed image may become upside down, or an image tilted in an oblique direction may be obtained. As a mechanism for correcting such an image, there is a camera including a function called rotate or the like.

In the camera including rotate, a rotatable portion including the lens (lens tube) is rotated in directions other than the pan direction and the tilt direction described above so that the lens can be rotated to an angle at which an uninverted, non-tilted image can be obtained.

There has been a possibility that, by rotating the rotatable portion, a cable will be unplugged when rotated 360 degrees or more, for example. In other words, there has been a possibility that if a user rotates the rotatable portion more than necessary, the cable will be unplugged. If the cable is unplugged, product reliability may be lowered, so it is necessary to prevent the cable from being unplugged.

The present technique has been made in view of the circumstances as described above and aims at preventing a cable from being unplugged from a rotatable portion.

Means for Solving the Problem

According to an aspect of the present technique, there is provided an image pickup apparatus including: an optical block constituted of a lens; an image pickup block constituted of an image pickup device; a lens tube that accommodates the optical block and the image pickup block and includes a rotating sphere section having a shape of a sphere larger than a hemisphere; a supporting member in which a circular opening having an inner diameter smaller than a diameter of the rotating sphere section is formed, the rotating sphere section being mounted on the supporting member on an outer side of the opening; and a retaining member in which a circular opening having an inner diameter smaller than the diameter of the rotating sphere section is formed, the retaining member accommodating the rotating sphere section on an inner side of the opening and preventing the lens tube from falling out, in which: the image pickup block is provided inside the rotating sphere section; at least a part of the optical block is positioned inside a virtual globe obtained by extending a spherical surface of the rotating sphere section; the rotating sphere section has two grooves formed on a front surface thereof; and the retaining member has a protrusion that comes into contact with the front surface of the rotating sphere section.

The protrusion may be constituted of a member having an elastic force.

The protrusion may be constituted of a plate-like spring, a width of the spring may be equal to or smaller than a width of the grooves, and a rotation of the rotating sphere section may be stopped by one end of the plate-like spring coming into contact with the protrusion constituting the virtual globe between the two grooves.

The protrusion may be constituted of a plate-like spring, a width of the spring may be larger than a width of the grooves, and a rotation of the rotating sphere section may be stopped by one end of the plate-like spring coming into contact with the protrusion constituting the virtual globe between the two grooves.

The grooves may be provided on the front surface of the rotating sphere section as an arc having an angle equal to or larger than a movable range of the lens tube in a tilt direction as a center angle.

The protrusion may be constituted of a column and a spring, and a state where the column is in contact with the front surface of the rotating sphere section may be maintained by a force of the spring.

According to the aspect of the present technique, the image pickup apparatus includes: the optical block constituted of a lens; the image pickup block constituted of an image pickup device; the lens tube that accommodates the optical block and the image pickup block and includes the rotating sphere section having a shape of a sphere larger than a hemisphere; the supporting member in which a circular opening having an inner diameter smaller than a diameter of the rotating sphere section is formed, the rotating sphere section being mounted on the supporting member on an outer side of the opening; and the retaining member in which a circular opening having an inner diameter smaller than the diameter of the rotating sphere section is formed, the retaining member accommodating the rotating sphere section on an inner side of the opening and preventing the lens tube from falling out. Further, the rotating sphere section has two grooves formed on a front surface thereof, and the retaining member has a protrusion that comes into contact with the front surface of the rotating sphere section.

Effects of the Invention

According to the aspect of the present technique, it is possible to prevent a cable from being unplugged from the rotatable portion.

It should be noted that the effect described herein is not necessarily limited, and any of the effects described in the present disclosure may be obtained.

MODE FOR CARRYING OUT THE INVENTION

Hereinafter, a configuration for embodying the present technique (hereinafter, referred to as embodiment) will be described.

It should be noted that the descriptions will be given in the following order.

1. External structure of image pickup apparatus
2. Internal structure of image pickup apparatus
3. Stopper structure
4. Other shapes of stopper <External Structure of Image Pickup Apparatus>

Hereinafter, an embodiment of the present technique will be described with reference to the drawings. It should be noted that in the following embodiment, a monitoring dome-type camera 10 is exemplified as a lens-tube-rotation-type image pickup apparatus. Specifically, the dome-type camera 10 of this embodiment is set on a ceiling, wall, or the like in hospitals, hotels, department stores, and the like for the purpose of securing safety, improving services, and the like and performs monitoring using photographed images.

Figure 1:
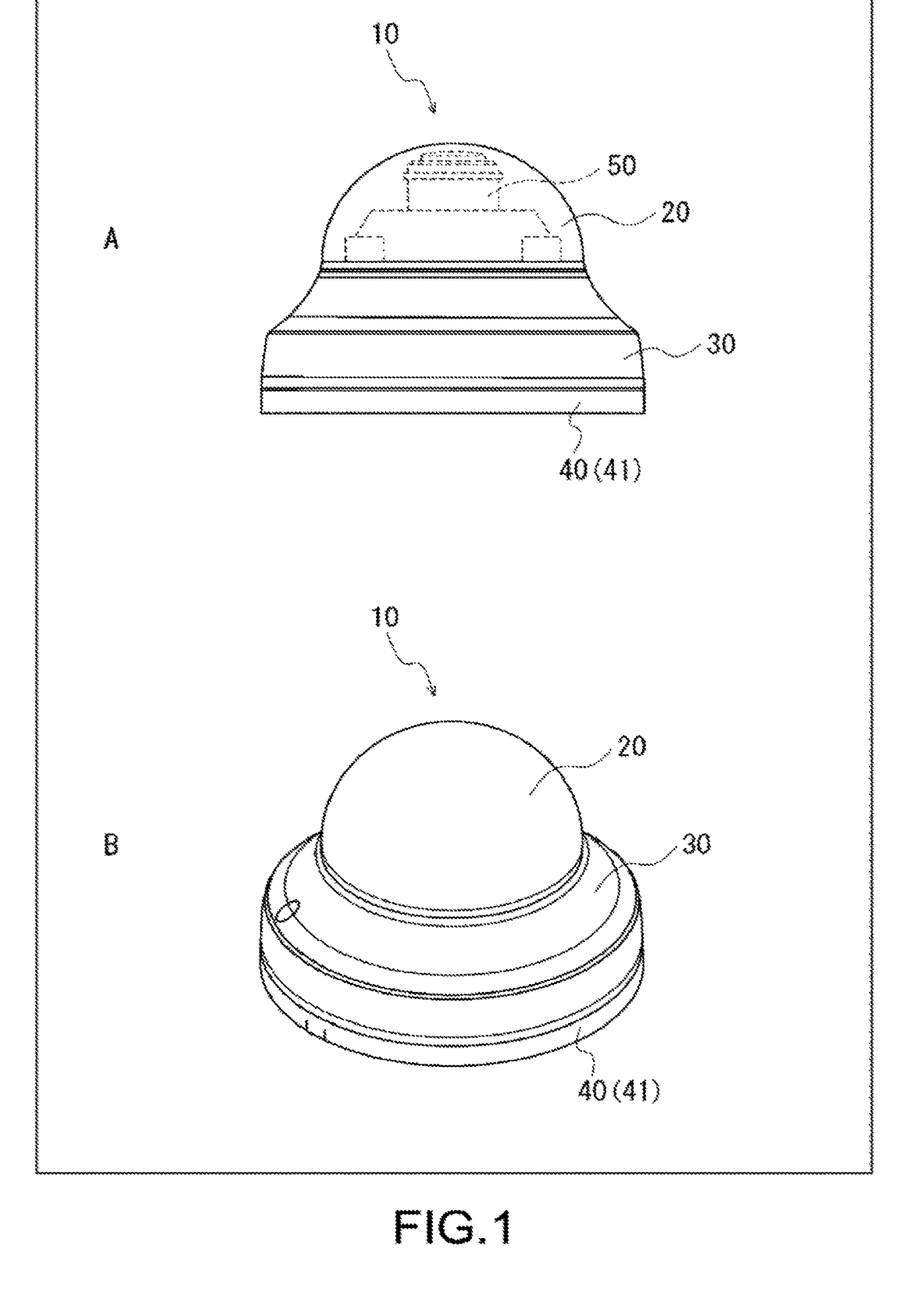
FIG. 1 Diagrams each showing an external structure of a camera to which the present technique is applied according to an embodiment.

FIG. 1 are external views each showing the dome-type camera 10 of this embodiment. FIG. 1A is a side view of the dome-type camera 10, and FIG. 1B is a perspective view thereof. As shown in FIG. 1, the dome-type camera 10 of this embodiment externally has a dome-type (hemispherical) cover 20 attached to a case 30 and is set on a ceiling, wall, or the like via a pedestal 40. It should be noted that when set on a ceiling, the cover 20 faces downward and the pedestal 40 is positioned at the top (ceiling side) contrary to that shown in FIG. 1.

Here, the cover 20 is a molded product (injection-molded product formed of acrylic resin) having optical transparency. In other words, by using an acrylic resin, the cover has an optical refractive index of 1.5 and optical transmittance of as high as 90% or more so as to become close to an optical lens, and accurate mirror finish can be obtained by the injection molding. In addition, the cover 20 of the dome-type camera 10 is generally translucent so as to be capable of picking up images while unrecognizably performing monitoring as much as possible.

For example, the optical transmittance, optical reflectance, and optical absorptivity are all set to be about 33% by mixing a carbon material when performing the injection molding and adjusting the optical transmittance to obtain smoke finish, or coating a front surface with metallic powder of aluminum or the like to obtain half-mirror finish.

Further, the case 30 is a molded product (molded product formed of ABS resin or the like) and formed to be cylindrical. In addition, the cover 20 is detachably attached to the case 30. Specifically, three protrusion pieces (not shown) are formed at a circular circumferential section of the cover 20 at regular intervals of 120°, and three notches (not shown) are formed on the case 30 in correspondence with the protrusion pieces.

Therefore, in attaching the cover 20, the protrusion pieces of the cover 20 are simultaneously inserted into the notches of the case 30, and the cover 20 is rotated so that the protrusion pieces are inserted deeply into the notches to be held in the case 30. On the other hand, when removing the cover 20 from the case 30, it is only necessary to rotate the cover 20 in a direction opposite to that during the attachment and pull out the protrusion pieces from the notches.

Inside the cover 20 and the case 30, a lens tube 50 (see FIG. 1A) accommodating an optical block 70 and an image pickup block 80 is provided, and the lens tube 50 is rotatably held on the pedestal 40. Therefore, by setting the lens tube 50 in a desired direction or angle by removing the cover 20 from the case 30, monitoring of a desired position can be performed based on photographed images. Moreover, the lens tube 50 (optical block) can be hidden from outside by attaching the translucent cover 20 to the case 30.

The dome-type camera 10 of this embodiment including the cover 20 and the case 30 as described above is set on ceilings, walls, and the like via the pedestal 40. Specifically, the pedestal 40 includes a disk-like base section 41 die-cast-molded by metal such as an aluminum alloy and is set on a ceiling or the like using an embedded bracket (not shown) attached to the base section 41. It should be noted that although the dome-type camera 10 is connected to a monitor in a monitoring room via a coaxial cable when set, the coaxial cable is also embedded into the ceiling or the like so as to be hidden from outside.

Figure 2:
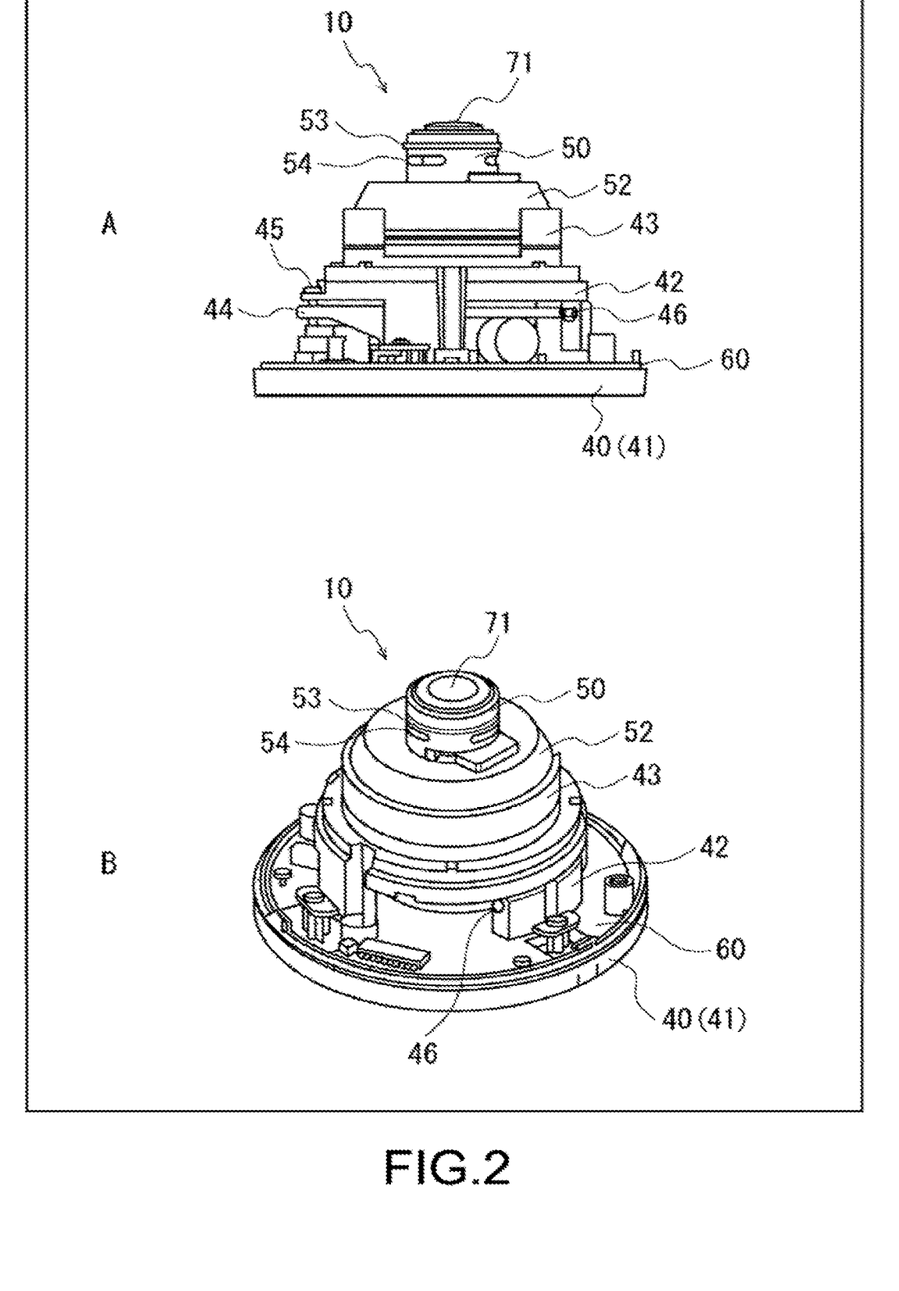
FIG. 2 External views each showing a pedestal and a lens tube.

FIG. 2 are external views each showing the pedestal 40 and the lens tube 50 in the dome-type camera 10 of this embodiment. FIG. 2A is a side view of the pedestal 40 and the lens tube 50, and FIG. 2B is a perspective view thereof. When the cover 20 and the case 30 are removed in the dome-type camera 10 shown in FIG. 1, the pedestal 40 and the lens tube 50 are exposed as shown in FIG. 2.

Here, the pedestal 40 includes the disk-like base section 41, a supporting member 42 that is set on the base section 41 and on which a rotating sphere section 52 of the lens tube 50 is mounted, and a cylindrical retaining member 43 that accommodates the rotating sphere section 52 and prevents the lens tube 50 from falling out. In addition, attached to the base section 41 is a circuit board 60 on which various electronic components are mounted, the electronic components used for photoelectrically converting a tone of light of an image imaged on an image pickup surface of the image pickup device into charge amounts and successively reading them out to convert them into electric signals. It should be noted that the circuit board 60 functions as a signal processing substrate and a power supply substrate and includes a monitor output terminal, a coaxial cable terminal, other switches and volumes, and the like.

Further, the supporting member 42 includes a disk-like movable plate 44 on which the rotating sphere section 52 is mounted, the movable plate 44 being structured to press the rotating sphere section 52 toward the retaining member 43, and a fixing screw 45 that reciprocates the movable plate 44. The movable plate 44 rotates about a rotating shaft 46 provided in the supporting member 42 at a circumferential section of the movable plate 44, and the fixing screw 45 is provided in the supporting member 42 on the other side of the rotating shaft 46 and screwed to the circumferential section of the movable plate 44.

Therefore, when the fixing screw 45 is rotated clockwise (screwing direction), the movable plate 44 rotates about the rotating shaft 46 on one end side (rotates upwardly in FIG. 2), and the other end side moves toward the retaining member 43. As a result, the rotating sphere section 52 mounted on the movable plate 44 is pressed toward the retaining member 43. On the contrary, when the fixing screw 45 is rotated counterclockwise, the movable plate 44 rotates oppositely about the rotating shaft 46 on one end side (rotates downwardly in FIG. 2), and the other end side moves toward the base section 41.

Further, the lens tube 50 is rotatable in the pan direction and tilt direction by the rotating sphere section 52 so that a lens 71 can be set at a desired orientation (direction and angle). It should be noted that a focus ring 53 and a zoom lever 54 are attached to the lens tube 50, and light from an image pickup object can be imaged on the image pickup surface of the image pickup device in a desired size.

Figure 3:
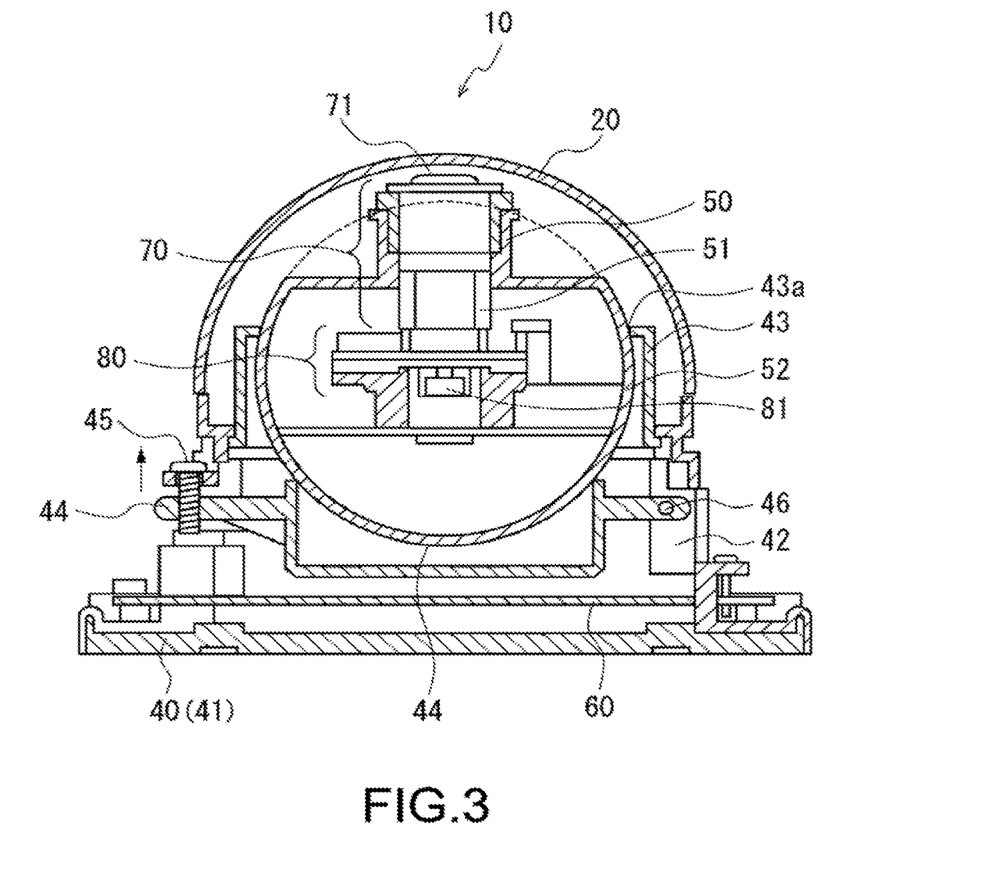
FIG. 3 A cross-sectional diagram of a camera.

Furthermore, the lens tube 50 is structured to be rotatable in a rotate direction. The dome-type camera 10 shown in FIGS. 1 to 3 is set on walls, ceilings, and the like and is also sometimes set on tilted walls and the like. Depending on where the dome-type camera is set, a photographed image may become upside down, or an image tilted in an oblique direction may be obtained. As a mechanism for correcting such an image, there is a camera including a function called rotate or the like.

In the camera including rotate, the lens 71 (lens tube 50) is rotated in directions other than the pan direction and tilt direction described above so that the lens can be rotated to an angle at which an uninverted, non-tilted image can be obtained.

By rotating the lens tube, the cable (not shown) may be unplugged when rotated 360 degrees or more, for example. For preventing such a case, the camera 10 to which the present technique is applied has a structure in which a stopper is provided with respect to the rotation direction of rotate and the lens tube 50 is controlled so as not to rotate a predetermined angle or more in the rotate direction. The stopper will be described with reference to FIG. 4 and subsequent figures.

<Internal Structure of Image Pickup Apparatus>

FIG. 3 is a cross-sectional diagram of the dome-type camera 10. The dome-type camera 10 shown in FIG. 3 uses a relatively-small lens 71, but the present technique is not limited to such a lens 71.

The optical block 70 constituted of the lens 71 is accommodated in the lens tube 50 including a cylindrical section 51 and the rotating sphere section 52. It should be noted that the lens tube 50 is die-cast-molded using metal such as an aluminum alloy.

Here, the lens 71 is a varifocal lens constituted of a plurality of relatively-small combination lenses or the like. By attaching the lens 71 inside the cylindrical section 51, the entire cylindrical section 51 constitutes the optical block 70. Moreover, for the optical block 70 to be positioned inside a virtual globe (virtual globe indicated by dotted line in FIG. 3) obtained by extending, while excluding the lens 71, the spherical surface of the rotating sphere section 52 in a shape of a sphere larger than a hemisphere, about half of the optical block 70 on a tip end side (lens 71 side) is positioned outside the rotating sphere section 52 and about half of the optical block 70 remaining on a rear end side is positioned inside a hollow section of the rotating sphere section 52.

Furthermore, a CCD device 81 is relatively small to be of a size corresponding to the size of the lens 71, and the image pickup block 80 constituted of the CCD device 81 is entirely positioned inside the rotating sphere section 52. Specifically, the image pickup block 80 is constituted of a CCD substrate on which the CCD device 81 is mounted, or the like in addition to the relatively-small CCD device 81, and the CCD device 81 is arranged on an optical axis of the lens 71 on the rear end side of the optical block 70. Therefore, the entire image pickup block 80 is positioned inside the hollow section of the rotating sphere section 52. It should be noted that image pickup signals of the CCD device 81 are transmitted to the circuit board 60 via a harness (not shown) that is an electrical wiring bundle.

As described above, the lens tube 50 accommodates the optical block 70 constituted of the relatively-small lens 71 and the image pickup block 80 constituted of the relatively-small CCD device 81. The optical block 70 is provided inside the cylindrical section 51, and the image pickup block 80 is provided inside the rotating sphere section 52 into which about half the cylindrical section 51 is embedded. In addition, the lens tube 50 including the cylindrical section 51 and the rotating sphere section 52 is rotatably held by the pedestal 40.

More specifically on this point, the supporting member 42 on which the rotating sphere section 52 is mounted and the retaining member 43 that accommodates the rotating sphere section 52 and prevents the lens tube 50 from falling out are provided on the base section 41 of the pedestal 40. In addition, the camera 10 uses the supporting member 42, the retaining member 43, and the rotating sphere section 52 as an angle adjustment mechanism that uses a ball joint.

Here, the supporting member 42 constituting the angle adjustment mechanism includes the bottomed, cylindrical movable plate 44 in which a circular opening 44a having an inner diameter smaller than a diameter of the rotating sphere section 52 is formed. The movable plate 44 is die-cast-molded with metal such as an aluminum alloy, and a circumferential section thereof is supported by the insertion of the rotating shaft 46 provided in the supporting member 42 while the circumferential section thereof on the other side is supported by the screwing of the fixing screw 45 provided in the supporting member 42 on the other side of the rotating shaft 46. Therefore, the rotating sphere section 52 can be mounted on an outer side of the opening 44*a* of the movable plate 44, and the mounted rotating sphere section 52 can rotate freely on the outer side of the opening 44*a*.

Further, the retaining member 43 is a bottomless, cylindrical member that is die-cast-molded with metal such as an aluminum alloy, and a circular opening 43*a* having an inner diameter smaller than the diameter of the rotating sphere section 52 is formed in the retaining member 43. In addition, the retaining member 43 accommodates (a large portion of) the rotating sphere section 52 in a space formed with the movable plate 44 by being fixed to the supporting member 42 on the outer side of the movable plate 44 and causing the cylindrical section 51 and the rotating sphere section 52 (partially) to protrude from the opening 43*a*. Therefore, the spherical surface of the rotating sphere section 52 formed as a sphere larger than a hemisphere, that is more on the cylindrical section 51 side than the hemisphere, is restrained by the circumferential section of the opening 43*a*, and thus the rotating sphere section 52 is prevented from falling out from the retaining member 43.

As described above, the rotating sphere section 52 is accommodated while the spherical surface thereof is fit into the opening 43*a* of the retaining member 43 and the opening 44*a* of the movable plate 44. However, in a state where there is a gap between the circumferential section of the opening 43*a* (or circumferential section of opening 44*a*) and the spherical surface of the rotating sphere section 52 and friction between them can be disregarded, no restraining force is generated with respect to the rotation of the rotating sphere section 52. Therefore, the lens 71 can be set to a predetermined orientation (direction and angle) by freely rotating the lens tube 50 in the pan, tilt, and rotate directions and adjusting the orientation thereof as appropriate.

Further, the lens tube 50 is fixed as shown in FIG. 3 after the orientation of the lens 71 is set. Specifically, when the fixing screw 45 is screwed, the movable plate 44 rotates about the rotating shaft 46 accompanying this, and the movable plate 44 that has been apart from the retaining member 43 on the fixing screw 45 side approaches the retaining member 43 (moves as indicated by arrow of FIG. 3). As a result, the rotating sphere section 52 mounted on the outer side of the opening 44*a* of the movable plate 44 also moves toward the opening 43*a* of the retaining member 43.

At this time, the circumferential section of the opening 44*a* comes into contact with the spherical surface of the rotating sphere section 52 to press the rotating sphere section 52, but since the moving direction of the movable plate 44 and that of the rotating sphere section 52 match (both move in direction indicated by arrow in FIG. 3), the positional relationship (orientation of lens tube 50) between the movable plate 44 and the rotating sphere section 52 does not change. In other words, since the movable plate 44 does not rotate relative to the rotating sphere section 52, a frictional force that rotates the rotating sphere section 52 is not generated, and the rotating sphere section 52 is only pressed in the same direction as the moving direction of the movable plate 44 (direction indicated by arrow in FIG. 3). Therefore, the rotating sphere section 52 moves toward the opening 43*a* of the retaining member 43 while maintaining the same position on the outer side of the opening 44*a* of the movable plate 44.

Then, when the spherical surface of the rotating sphere section 52 comes into contact with the circumferential section of the opening 43*a*, the rotating sphere section 52 is pressed by the opening 43*a* to be pressurized between the opening 43*a* of the retaining member 43 and the opening 44*a* of the movable plate 44 as shown in FIG. 3. Accordingly, the rotating sphere section 52 is unmovably fixed to the movable plate 44. As a result, the lens tube 50 is unmovably fixed while maintaining the adjusted pan, tilt, and rotate directions, and thus the orientation (direction and angle) of the lens 71 is set accurately.

As described above, by rotating the rotating sphere section 52 and fixing it as appropriate in the dome-type camera 10, the direction and angle of the lens tube 50 (orientation of lens 71) can be set easily and accurately. A desired position can be monitored by attaching the cover 20 and picking up images.

Further, since the optical block 70 (excluding portion of lens 71) is positioned inside the virtual globe of the rotating sphere section 52 indicated by the dotted line in FIG. 3, the lens 71 (cylindrical section 51) can be enlarged as much as possible without increasing the radius from the rotating center of the rotating sphere section 52 to the lens 71 as long as the optical block 70 can be provided inside the hollow section of the rotating sphere section 52. Therefore, brightness of the lens 71 can be increased to obtain high image quality while using the same cover 20.

<Stopper Structure>

The pan direction and tilt direction are set at predetermined angles. For example, the pan direction is set within a movable range of ±30 degrees, and the tilt direction is set within a movable range of 0 to 90 degrees. Since a user sets the camera 10 while facing the lens 71 toward a direction to be photographed, the pan and tilt directions are adjusted as minor adjustments after the setting in many cases. Therefore, if the pan and tilt directions are set within the predetermined movable angle ranges, it is possible to face the lens tube 50 in a direction desired by the user.

The rotate direction is a direction in which the camera 10 may become largely movable depending on the set location. For example, since the upper and lower sides of a photographed image completely differs between a case where the camera 10 is set on a ceiling and a case where the camera 10 is set on a desk or the like, the movable range of the rotate direction is larger the better considering the case of rotating the lens tube 50 to a direction in which the upper and lower sides are photographed correctly.

By providing the rotating sphere section 52 as in this embodiment, the lens tube 50 also becomes movable in the rotate direction, and it is also possible to rotate the lens tube 50 within the range of 360 degrees. However, in the case of a structure in which rotations are possible within the range of 360 degrees and a stopper is not provided, while the user can rotate the lens tube 50 in a desired rotate direction, the cable may be unplugged when rotated too much.

In this regard, descriptions will be given on a structure in which a stopper is provided so as to enable movements within a predetermined range in the rotate direction and the predetermined range to be set as a range close to 360 degrees. Moreover, the provision of the stopper enables those described above to be performed also in the pan and tilt directions instead of restricting movements in the pan and tilt directions.

Figure 4:
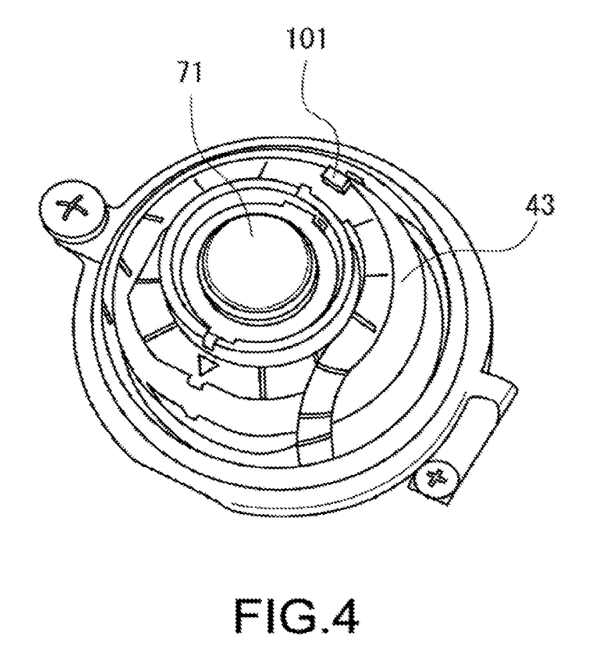
FIG. 4 A diagram for explaining a stopper spring.
Figure 5:
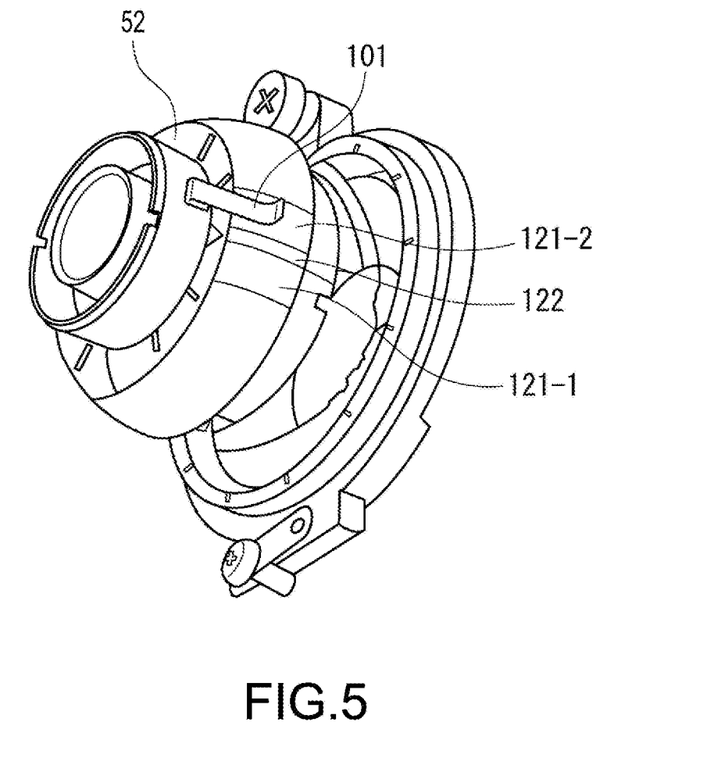
FIG. 5 A diagram for explaining grooves.

FIGS. 4 and 5 are each a diagram for explaining the stopper related to the rotate direction. The stopper is provided in the retaining member 43 and the rotating sphere section 52.

As shown in FIG. 4, a stopper spring 101 is provided in a part of the retaining member 43. Although the stopper spring 101 is exemplified herein, any other members excluding a spring may be used as long as they have the following functions. It should be noted that a so-called leaf spring or the like as a plate-like spring is shown in FIG. 4, and a case where the leaf spring is used as the stopper spring 101 will be described as an example.

As shown in FIG. 5, two grooves 121-1 and 121-2 are provided in the rotating sphere section 52, and a protrusion 122 is provided between the grooves 121-1 and 121-2.

The protrusion 122 constitutes the virtual globe (portion indicated by dotted line in FIG. 3) of the rotating sphere section 52, and a tip end of the protrusion 122 is a curved surface constituting the sphere. The grooves 121-1 and 121-2 have structures as if portions constituting the virtual globe of the rotating sphere section 52 have been scraped off. In the descriptions below, when there is no need to individually distinguish the grooves 121-1 and 121-2 from each other, the grooves will simply be described as grooves 121.

Figure 6:
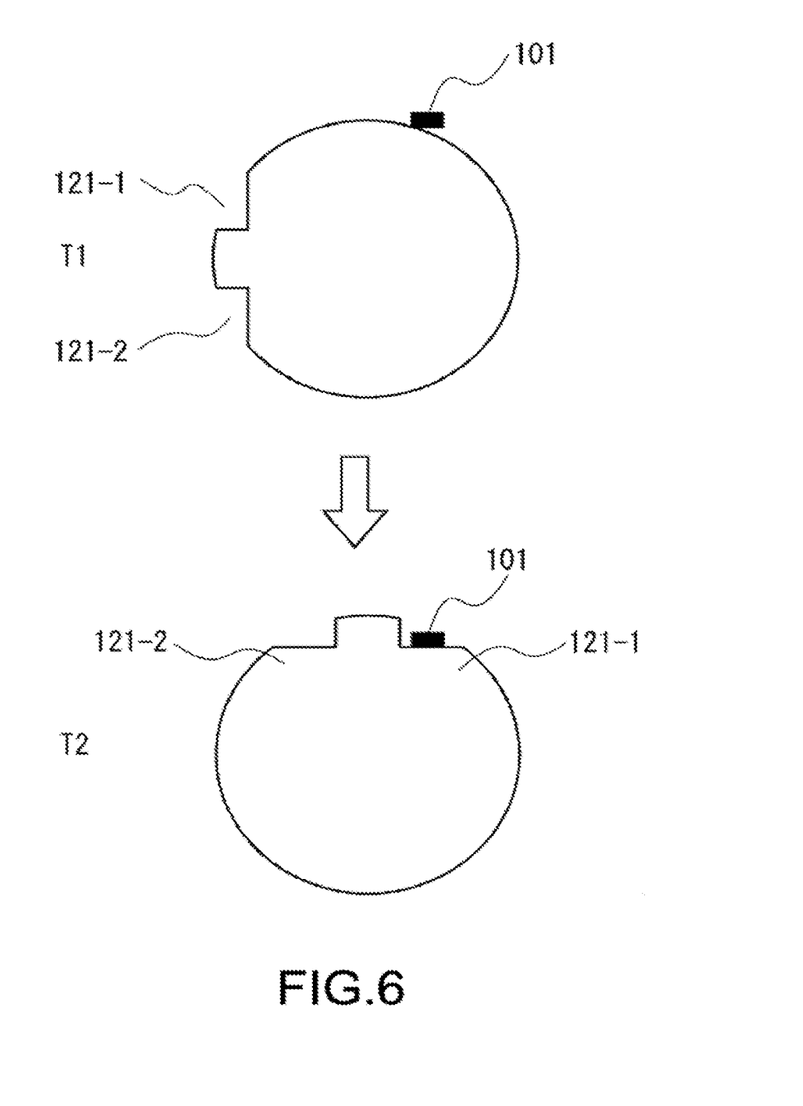
FIG. 6 A diagram for explaining a stopper mechanism.

Referring to FIG. 6, the stopper spring 101 and the grooves 121 when functioning as the stopper will be described.

At a time T1, the stopper spring 101 is in contact with a part of the rotating sphere section 52. The stopper spring 101 is structured to be capable of constantly maintaining a state where it is in contact with the rotating sphere section 52. Assuming that the rotating sphere section 52 rotates rightwardly as shown in the figure, the state where the stopper spring 101 is in contact with the rotating sphere section 52 is maintained as shown in the figure also while the rotating sphere section 52 is rotating.

By rotating the rotating sphere section 52 at a time T2, the groove 121-1 provided on the front surface of the rotating sphere section 52 is positioned at the position of the stopper spring 101. The stopper spring 101 is in contact with a part of the spherical surface of the rotating sphere section 52 while the rotating sphere section 52 is rotating and comes into contact with the groove 121-1 by an elastic force of the spring when positioned at the portion of the groove 121-1.

When the user additionally rotates the rotating sphere section 52 rightwardly from the state where the stopper spring 101 is positioned at the groove 121-1, the left-hand side of the stopper spring 101 in the figure comes into contact with the protrusion 122. When the stopper spring 101 comes into contact with the protrusion 122, the rotating sphere section 52 does not rotate any more in the right-hand direction. In other words, the stopper functions to stop the rotation of the rotating sphere section 52.

Although not shown, assuming that the rotating sphere section 52 is rotated leftwardly at the time T1, the stopper spring 101 is in contact with a part of the spherical surface of the rotating sphere section 52 while the rotating sphere section 52 is rotating and comes into contact with the groove 121-2 by the elastic force of the spring when positioned at the portion of the groove 121-2 in the case where the rotating sphere section 52 is rotated leftwardly as in the case where the rotating sphere section 52 is rotated rightwardly.

Then, when the user additionally rotates the rotating sphere section 52 lefttwardly from the state where the stopper spring 101 is positioned at the groove 121-2, the stopper spring 101 comes into contact with the protrusion 122. When the stopper spring 101 comes into contact with the protrusion 122, the rotating sphere section 52 does not rotate any more in the left-hand direction. In other words, the stopper functions to stop the rotation of the rotating sphere section 52.

By providing the grooves 121 in the rotating sphere section 52 and the stopper spring 101 in the retaining member 43 as described above, the rotation angle in the rotate direction can be controlled, and it becomes possible to prevent the cable (not shown) from being unplugged by the over-rotation.

<Other Shapes of Stopper>

As described above, the stopper spring 101 is structured such that at least a part of the stopper spring 101 is constantly in contact with the spherical surface of the rotating sphere section 52 and the grooves 121. For maintaining such a state, a so-called leaf spring or the like as the plate-like spring is used as the stopper spring 101, for example. The leaf spring has a plate-like shape having a predetermined width and thickness, and the shape can be obtained relatively easily by being processed into a desired shape.

One end of the leaf spring (stopper spring 101) shown in FIG. 5 is shaped as if to be latched on the retaining member 43, and the other end thereof is partially bent as if to come into contact with the rotating sphere section 52. The leaf spring processed as described above can be used as the stopper spring 101.

Figure 7:
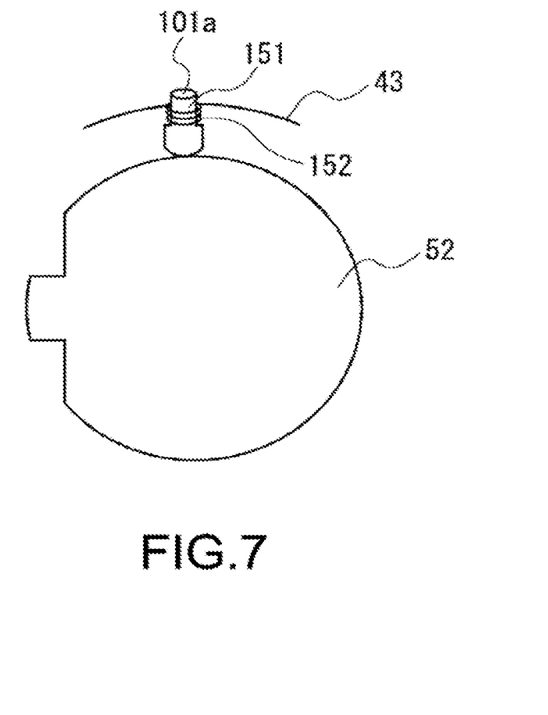
FIG. 7 A diagram for explaining other structures of the stopper spring.

Further, a stopper spring 101a as shown in FIG. 7 may also be used. The stopper spring 101a shown in FIG. 7 is constituted of a cylinder 151 and a spring 152. The cylinder 151 is cylindrical, but the shape may be of other columns excluding a cylinder. In addition, the cylinder 151 is provided while penetrating a hole provided in the retaining member 43.

The cylinder 151 of the stopper spring 101a shown in FIG. 7 includes a thin portion and a thick portion, and the thin portion is inserted into the spring 152. The cylinder 151 is structured such that a state where it is in contact with the rotating sphere section 52 is constantly maintained by the elastic force of the spring 152. When the rotating sphere section 52 is rotated and the stopper spring 101a is positioned at the position of the groove 121, the cylinder 151 is positioned at that groove 121.

When the rotating sphere section 52 is additionally rotated in the state where the cylinder 151 is positioned at the groove 121, the cylinder 151 comes into contact with the protrusion 122 so as to disable further rotations. As long as the state where the cylinder 151 is constantly in contact with the rotating sphere section 52 is maintained by the elastic force of the spring 152 as described above, the shape and size of the cylinder 151, the position and size of the spring 152, and the like can be changed as appropriate.

The stopper spring 101a may be formed in a shape of a protrusion as described above. In other words, it is only necessary to provide a protrusion having a certain level of elastic force in the retaining member 43 so that the state where the stopper spring 101a is constantly in contact with the front surface of the rotating sphere section 52 can be maintained.

Moreover, the stopper spring 101 may be constituted of one member like a leaf spring or may be constituted of two or more members like the cylinder 151 and the spring 152.

Next, the length of the groove 121 will be described. The groove 121 is provided on the front surface of the rotating sphere section 52 as a line having a predetermined width. The length of the groove 121 may be from one end of the spherical surface portion of the rotating sphere section 52 to the other end or may be set within the range of a predetermined angle a as shown in FIG. 8.

Figure 8:
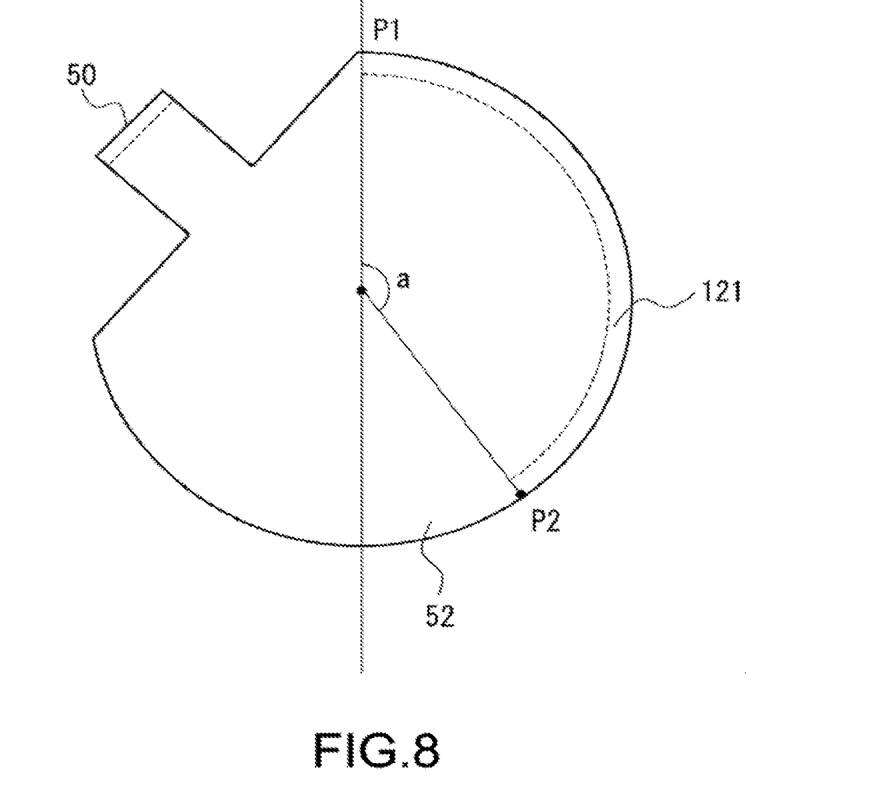
FIG. 8 A diagram for explaining a groove length.

In the example shown in FIG. 8, the groove 121 is provided from a position P1 to a position P2 on the spherical surface of the rotating sphere section 52, and the length becomes an angle a when expressed by the center angle of the virtual globe of the rotating sphere section 52. The length of the groove 121 needs to take into account the movable range in the tilt direction.

The lens tube 50 needs to be movable in the tilt direction even when the stopper spring 101 is positioned at the groove 121. For example, when the movable range in the tilt direction is an angle b, the lens tube 50 needs to be movable in the tilt direction within the range of the angle b even when the stopper spring 101 is positioned at the groove 121.

Therefore, when the movable range in the tilt direction is the angle b, it is favorable for the angle a at which the groove 121 is provided to be equal to or larger than the angle b. In other words, it is favorable to set the groove 121 so as to satisfy angle a≥angle b. In other words, the groove 121 is provided on the front surface of the rotating sphere section 52 as an arc having an angle equal to or larger than the movable range of the lens tube 50 in the tilt direction as the center angle.

Next, the width of the groove 121 will be described. Here, descriptions will continue on the case where the leaf spring is used as the stopper spring 101. When the width of the stopper spring 101 is width W1 and the width of the groove 121 is W2 as shown in FIG. 9A, the width of the stopper spring 101 and that of the groove 121 are set so as to satisfy the relationship of width W1≤width W2.

Figure 9:
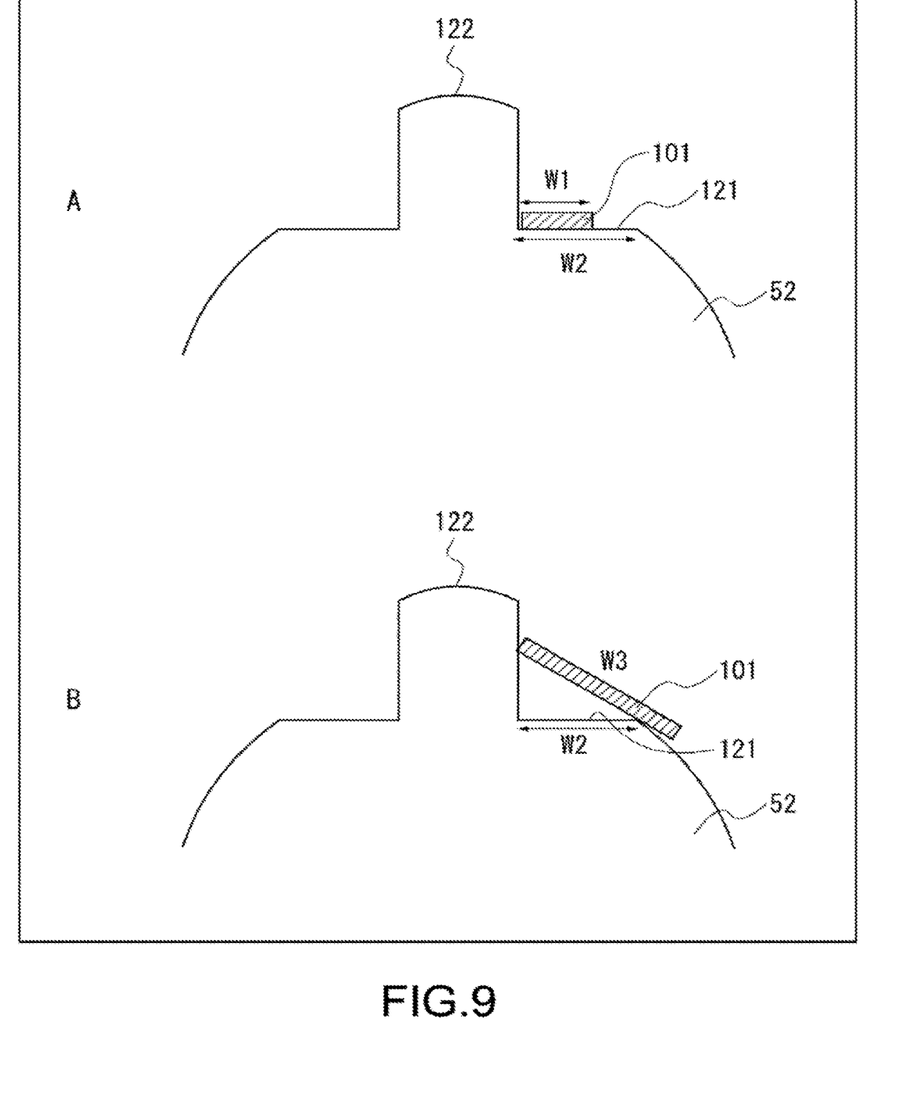
FIG. 9 Diagrams for explaining a width of the stopper spring.

In this case, the stopper spring 101 fits within the width of the groove 121 as shown in FIG. 9A so that the stopper spring 101 positively comes into contact with the protrusion 122 and functions as the stopper.

Alternatively, when the width of the stopper spring 101 is width W3 and the width of the groove 121 is W2 as shown in FIG. 9B, the width of the stopper spring 101 and that of the groove 121 are set so as to satisfy the relationship of width W2<width W3.

In this case, as shown in FIG. 9B, a triangle having the stopper spring 101 as an oblique side and parts of the groove 121 and protrusion 122 as two sides is formed. In such a state, since one end of the stopper spring 101 comes into contact with the protrusion 122, the stopper spring 101 functions as the stopper. Therefore, the function as the stopper can also be realized when the width of the stopper spring 101 and that of the groove 121 are set so as to satisfy the relationship of width W2<width W3.

Next, the shape of the groove 121 will be described. As the shape of the groove 121, the case where the angle formed between the groove 121 and the protrusion 122 is an angle c as a right angle as shown in FIG. 10A has been exemplified in the embodiment above.

Figure 10:
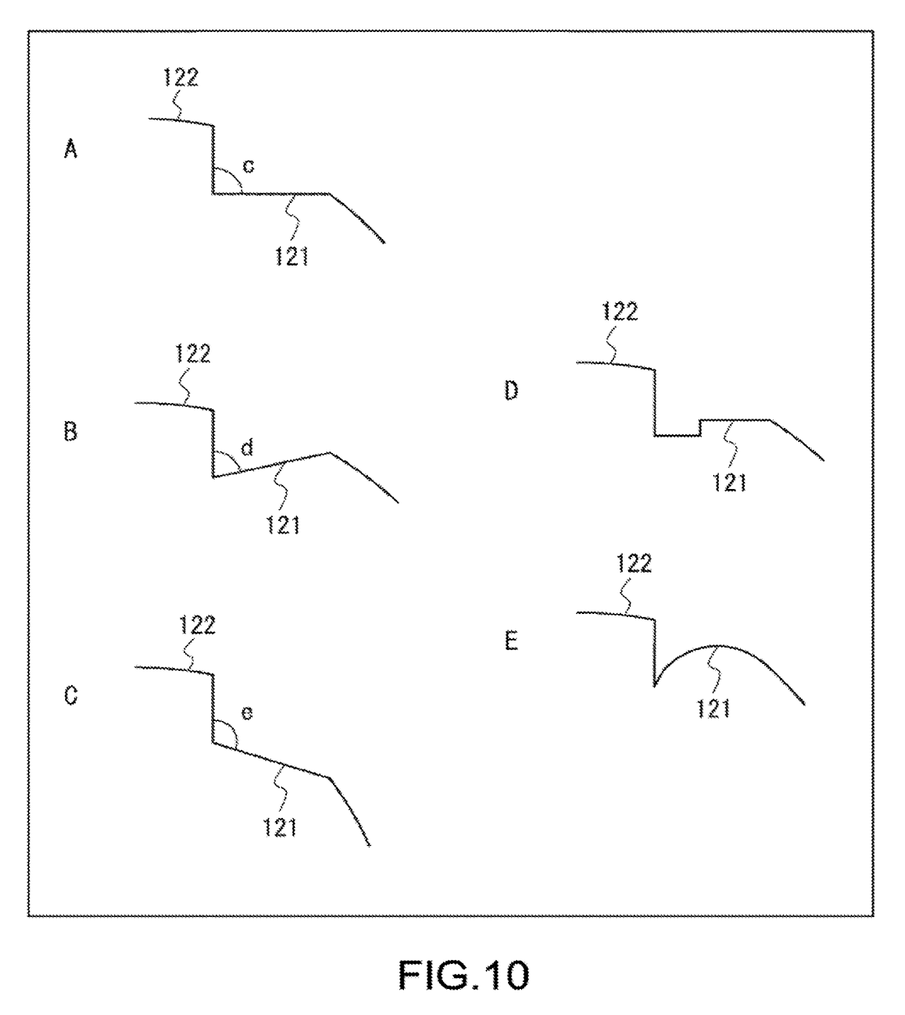
FIG. 10 Diagrams for explaining a groove shape.

As shown in FIG. 10B, an angle d formed between the groove 121 and the protrusion 122 may be 90 degrees or less. Alternatively, as shown in FIG. 10C, an angle e formed between the groove 121 and the protrusion 122 may be 90 degrees or more.

Alternatively, as shown in FIG. 10D, the groove 121 may be formed stepwise. Alternatively, as shown in FIG. 10E, the groove 121 may be formed as a curved surface.

It is favorable for the groove 121 to have a shape in which, when the rotating sphere section 52 is rotated, the stopper spring 101 is smoothly guided to the groove 121 from the curved surface of the rotating sphere section 52 without a sense of being stuck, for example. Moreover, it is favorable for the groove 121 and the protrusion 122 to have shapes in which the stopper spring 101 positively comes into contact with the protrusion 122 after the stopper spring 101 is positioned in the groove 121.

The width of the protrusion 122, that is, the interval between the grooves 121-1 and 121-2 is smaller the better. The width of the protrusion 122 affects the movable range. The portion corresponding to the width of the protrusion 122 is a range in which the rotating sphere section 52 cannot move due to control of the stopper. Therefore, when the width of the protrusion 122 is large, the range in which the rotating sphere section 52 is rotatable becomes small.

When the width of the protrusion 122 is small, the range in which the rotating sphere section 52 is rotatable becomes close to 360 degrees. Therefore, it is favorable to set the width of the protrusion 122 small.

As described above, the protrusion 122 is formed by providing the groove 121 in the rotating sphere section 52, and a protrusion that is in contact with the front surface of the rotating sphere section 52, such as the stopper spring 101, is provided. The stopper spring 101 is structured such that the state where it is in contact with the front surface of the rotating sphere section 52 excluding the protrusion 122 as if sliding smoothly is maintained.

With such a structure, it becomes possible to prevent over-rotations in the rotate direction. Moreover, also as the structure in which such rotation control can be performed, a structure that does not affect the movable range in the tilt direction can be obtained.

If rotated too much in the rotate direction, the cable may be unplugged. However, according to the present technique, the rotation in the rotate direction can be controlled, so the possibility of such a circumstance occurring can be reduced.

It should be noted that although the dome-type camera 10 has been exemplified in the embodiment above, an applicable range of the present technique is not limited to the dome-type camera 10. For example, the present technique is also applicable to a case where a rotatable member is provided and a rotation of the rotatable member in a predetermined direction, that is, the rotate direction in the example above, is to be controlled.

It should be noted that the effects described in the specification are mere examples, and other effects may be obtained without being limited to those examples.

It should be noted that the embodiment of the present technique is not limited to the embodiment described above and can be variously modified without departing from the gist of the present technique.

It should be noted that the present technique may also take the following structures.

(1) An image pickup apparatus, including:
an optical block constituted of a lens;
an image pickup block constituted of an image pickup device;
a lens tube that accommodates the optical block and the image pickup block and includes a rotating sphere section having a shape of a sphere larger than a hemisphere;
a supporting member in which a circular opening having an inner diameter smaller than a diameter of the rotating sphere section is formed, the rotating sphere section being mounted on the supporting member on an outer side of the opening; and
a retaining member in which a circular opening having an inner diameter smaller than the diameter of the rotating sphere section is formed, the retaining member accommodating the rotating sphere section on an inner side of the opening and preventing the lens tube from falling out, in which:
the image pickup block is provided inside the rotating sphere section;
at least a part of the optical block is positioned inside a virtual globe obtained by extending a spherical surface of the rotating sphere section;

the rotating sphere section has two grooves formed on a front surface thereof; and the retaining member has a protrusion that comes into contact with the front surface of the rotating sphere section.

(2) The image pickup apparatus according to (1) above, in which the protrusion is constituted of a member having an elastic force.

(3) The image pickup apparatus according to (1) above, in which:

the protrusion is constituted of a plate-like spring;

a width of the spring is equal to or smaller than a width of the grooves; and a rotation of the rotating sphere section is stopped by one end of the plate-like spring coming into contact with the protrusion constituting the virtual globe between the two grooves.

(4) The image pickup apparatus according to (1) above, in which:

the protrusion is constituted of a plate-like spring;

a width of the spring is larger than a width of the grooves; and a rotation of the rotating sphere section is stopped by one end of the plate-like spring coming into contact with the protrusion constituting the virtual globe between the two grooves.

(5) The image pickup apparatus according to any one of (1) to (4) above, in which the grooves are provided on the front surface of the rotating sphere section as an arc having an angle equal to or larger than a movable range of the lens tube in a tilt direction as a center angle.

(6) The image pickup apparatus according to (1) above, in which:

the protrusion is constituted of a column and a spring; and a state where the column is in contact with the front surface of the rotating sphere section is maintained by a force of the spring.

DESCRIPTION OF REFERENCE NUMERALS

10 camera
40 pedestal
42 supporting member
43 retaining member
44 movable plate
45 fixing screw
46 rotating shaft
50 lens tube
52 rotating sphere section
70 optical block
71 lens
80 image pickup block
81 CCD device
101 stopper spring
121 groove
122 protrusion

The invention claimed is:

1. An image pickup apparatus, comprising:

an optical portion that includes a lens;

an image pickup device;

a lens tube that accommodates the optical portion and the image pickup device and includes a rotating sphere section having a spherical shape larger than a hemisphere;

a supporting member in which a first circular opening having an inner diameter smaller than a diameter of the rotating sphere section is formed, the rotating sphere section being movably mounted on the supporting member on an outer side of the first circular opening; and a retaining member in which a second circular opening having an inner diameter smaller than the diameter of the rotating sphere section is formed, the retaining member accommodating the rotating sphere section on an inner side of the second circular opening and preventing the lens tube from falling out, wherein the image pickup device is provided inside the rotating sphere section, at least a part of the optical portion is positioned inside a virtual globe obtained by extending a spherical surface of the rotating sphere section, the rotating sphere section includes a front surface and a protrusion protruding from the front surface, the retaining member has a stopper structure that is slidable along the front surface of the rotating sphere section while in contact with the front surface of the rotating sphere section by an elastic force, and a rotation of the rotating sphere section with respect to the retaining member along a rotation direction is limited to a range defined according to the stopper structure coming into contact with opposite sides of the protrusion.

2. The image pickup apparatus according to claim 1, wherein the stopper structure includes a member having the elastic force.

3. The image pickup apparatus according to claim 1, wherein the rotating sphere section includes two grooves formed on the front surface of the rotating sphere section, and the protrusion is disposed between the two grooves and constitutes a portion of the virtual globe.

4. The image pickup apparatus according to claim 3, wherein:

the stopper structure includes a plate-like spring;

a width of the spring is larger than a width of the grooves; and the rotation of the rotating sphere section is stopped by one end of the plate-like spring coming into contact with the protrusion of the rotating sphere section.

5. The image pickup apparatus according to claim 3, wherein the grooves are provided on the front surface of the rotating sphere section as an arc having an angle equal to or larger than a movable range of the lens tube in a tilt direction as a center angle.

6. The image pickup apparatus according to claim 1, wherein:

the stopper structure includes a column and a spring; and a state where the column is in contact with the front surface of the rotating sphere section is maintained by a force of the spring.

7. The image pickup apparatus according to claim 3, wherein:

the stopper structure includes a plate-like spring;

a width of the spring is equal to or smaller than a width of the grooves; and the rotation of the rotating sphere section is stopped by one end of the plate-like spring coming into contact with the protrusion of the rotating sphere section.

8. An image pickup apparatus, comprising:

a lens tube including a rotating sphere section that has a spherical shape larger than a hemisphere;

a supporting member; and a retaining member in which a circular opening having an inner diameter smaller than a diameter of the rotating sphere section is formed, the retaining member accommodating the rotating sphere section on an inner side of the circular opening, and a portion of the rotating sphere section being movably received between the supporting member and the retaining member, wherein the rotating sphere section includes a front surface and a protrusion protruding from the front surface, the retaining member has a stopper structure that is slidable along the front surface of the rotating sphere section while in contact with the front surface of the rotating sphere section by an elastic force, and a rotation of the rotating sphere section with respect to the retaining member along a rotation direction is limited to a range defined according to the stopper structure coming into contact with opposite sides of the protrusion.

9. The image pickup apparatus according to claim 8, wherein:

the stopper structure includes a plate-like spring; and the rotation of the rotating sphere section is stopped by one end of the plate-like spring coming into contact with the protrusion of the rotating sphere section.

10. The image pickup apparatus according to claim 8, wherein the rotating sphere section is movable along a tilt direction and a pan direction that are different from the rotation direction.

11. The image pickup apparatus according to claim 1, wherein the rotating sphere section is movable along a tilt direction and a pan direction that are different from the rotation direction.

* * * * *